United States Patent [19]
Stadelmann et al.

[11] Patent Number: 5,335,522
[45] Date of Patent: Aug. 9, 1994

[54] WASHING MACHINE

[75] Inventors: Ludwig Stadelmann, Altdorf; Dieter Mayer, Sulzbach-Rosenberg, both of Fed. Rep. of Germany

[73] Assignee: Suspa Compart Aktiengesellschaft, Altdorf, Fed. Rep. of Germany

[21] Appl. No.: 74,663

[22] Filed: Jun. 10, 1993

Related U.S. Application Data

[62] Division of Ser. No. 834,090, Feb. 12, 1990, Pat. No. 5,230,229.

[30] Foreign Application Priority Data

Feb. 23, 1991 [DE] Fed. Rep. of Germany ....... 4105763

[51] Int. Cl.⁵ ............................................. D06F 37/22
[52] U.S. Cl. ...................................... 68/23.1; 403/79; 403/155
[58] Field of Search ............... 68/23.1; 248/638; 210/364, 365; 403/79, 157, 159, 354, 375, 155

[56] References Cited

U.S. PATENT DOCUMENTS

| | | | |
|---|---|---|---|
| 2,895,697 | 7/1959 | Pagliuso | 403/79 X |
| 3,262,661 | 7/1966 | Johnson et al. | 248/638 X |
| 4,548,590 | 10/1985 | Green | 403/354 X |
| 4,643,116 | 2/1987 | Ulmer et al. | 403/375 X |

FOREIGN PATENT DOCUMENTS

| | | | |
|---|---|---|---|
| 252570 | 6/1964 | Australia | 68/23.1 |
| 2336604 | 6/1975 | Fed. Rep. of Germany . | |
| 8127163 | 9/1981 | Fed. Rep. of Germany . | |
| 3228674 | 2/1984 | Fed. Rep. of Germany . | |
| 3400146 | 10/1986 | Fed. Rep. of Germany . | |
| 3538973 | 5/1987 | Fed. Rep. of Germany . | |
| 1152307 | 1/1963 | France | 68/23.1 |
| 2194252 | 7/1992 | France . | |
| 54-057076 | 8/1979 | Japan . | |
| 856569 | 12/1960 | United Kingdom . | |
| 977792 | 12/1964 | United Kingdom | 403/157 |

*Primary Examiner*—Philip R. Coe
*Attorney, Agent, or Firm*—Browdy and Neimark

[57] ABSTRACT

For an articulation of a vibration damper for a washing machine the vibration damper has an articulated bush supported in a bearing. The latter has cheeks accommodating between them the articulated bush and having inlets for a bearing body leading to a bearing opening. The bearing body is retained in the bearing openings by means of an elastic locking mechanism in the direction of the inlets.

28 Claims, 5 Drawing Sheets

FIG. 6 ized as 5,335,522

WASHING MACHINE

This is a division of copending parent application Ser. No. 07/834,090 filed Feb. 12, 1992, and now U.S. Pat. No. 5,230,229.

FIELD OF THE INVENTION

The invention relates to a washing machine having a washer unit with a horizontal drum axis arranged in a washing machine housing, a vibration damper being supported in each case with an articulated bush in a bearing on the washer unit and in a bearing on the washing machine housing to pivot about pivot axes each parallel with the drum axis, the respective bearing having two cheeks, which accommodate between them the articulated bush and in which bearing openings are provided, in each of which a bearing body connected with the articulated bush is supported, and the vibration damper having a central longitudinal axis intersecting the pivot axes.

BACKGROUND OF THE INVENTION

It is well known to use threaded bolts as bearing bodies, which after having been passed through the cheeks of the bearing are arrested by means of a nut.

Further, it is well known from EP 0 217 234 B1 to use a bearing bolt as a bearing body which after introduction of the articulated bush between the cheeks of the bearing is pushed through laterally. It is secured against falling out by means of an elastic tongue formed on a cheek. Having a comparatively complicated form such a bearing can only be made of plastic material from economic aspects. Moreover, the pushing through of the bolt requires the articulated bush to be in exact alignment relative to the bearing openings of the cheeks of the bearing; the assembly, therefore, requires some expense.

SUMMARY OF THE INVENTION

It is an object of the invention to embody an articulation of a vibration damper for a washing machine of the genetic kind in such a way that particularly simple assembly is ensured.

This object is attained according to the invention by the features that each bearing opening of at least one bearing is provided with an inlet for the bearing body open towards an edge of the respective cheek and that the bearing body is retained in the bearing openings by means of an elastic locking in the direction of the inlets. The measures according to the invention ensure that the vibration damper with its articulated bush is only inserted into the corresponding bearing, the bearing body slipping into the respective bearing openings through the inlets. Then the elastic locking mechanism closes. The assembly is finished. The embodiment according to which the inlets are biased relative to the central longitudinal axis of the vibration damper has the advantage that during operation no forces are exerted on the bearing body in the direction towards the inlet. The expense necessary for the locking mechanism can therefore be kept especially low.

The advantage of the embodiment according to which the inlets are formed to be open approximately in the direction of the central longitudinal axis and towards the vibration damper resides in that the assembly is particulary simple.

A particularly simple embodiment is reflected with the locking taking place when the bearing body formed as a bearing sleeve to be elastically compressed is slipped through the inlet into the bearing openings. This embodiment is preferably realized in combination with the inlets being biased relative to the central longitudinal axis of the vibration damper.

The embodiment according to which the bearing body is in the form of a bearing bolt and the bearing bolt is arrested by elastic locking by means of at least one safety clamp requires an additional manual operation upon assembly; but the reliability of the locking is particularly high.

Further advantages, features and details of the invention result from the ensuing description of a plurality of exemplary embodiments taken in conjunction with the drawings.

DESCRIPTION OF THE PREFERRED EMBODIMENTS

Figure 1:
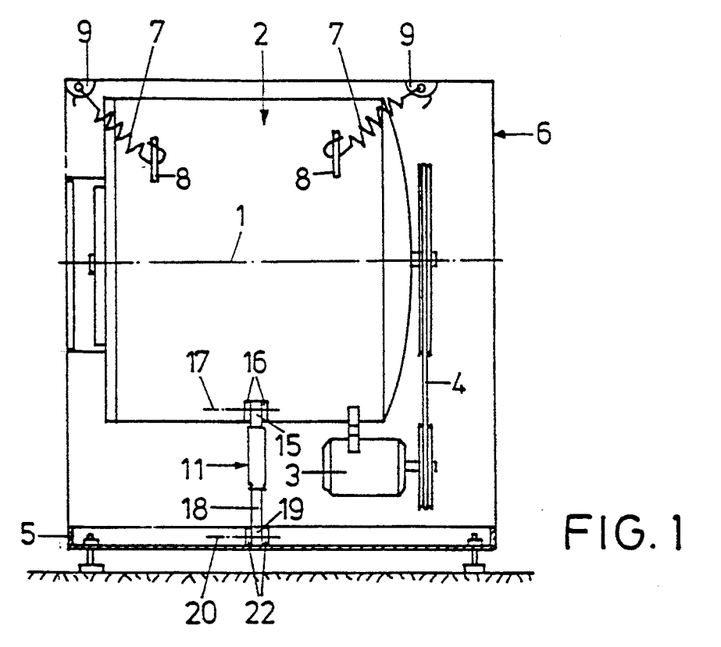
FIG. 1 is a lateral view of a drum washing machine in a diagrammatic representation.
Figure 2:
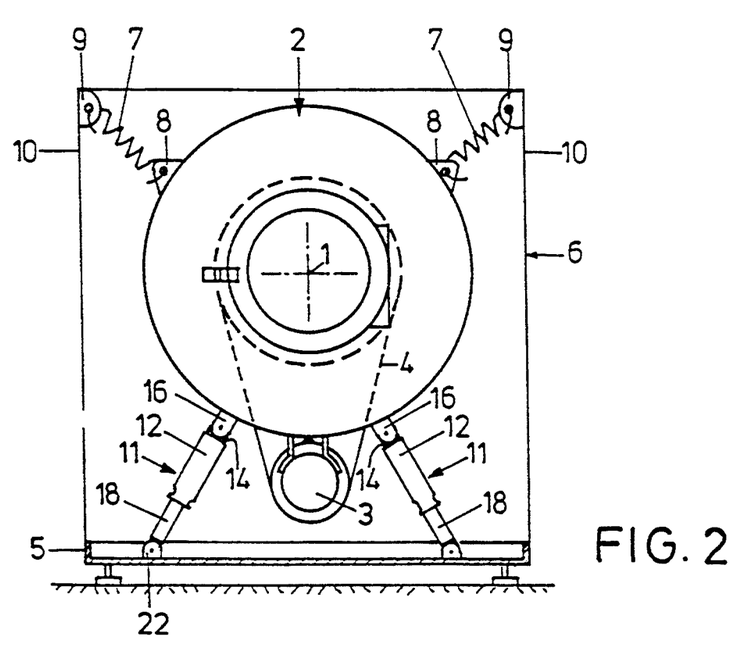
FIG. 2 is a front view of the drum washing machine according to FIG. 1.
Figures 3, 4:
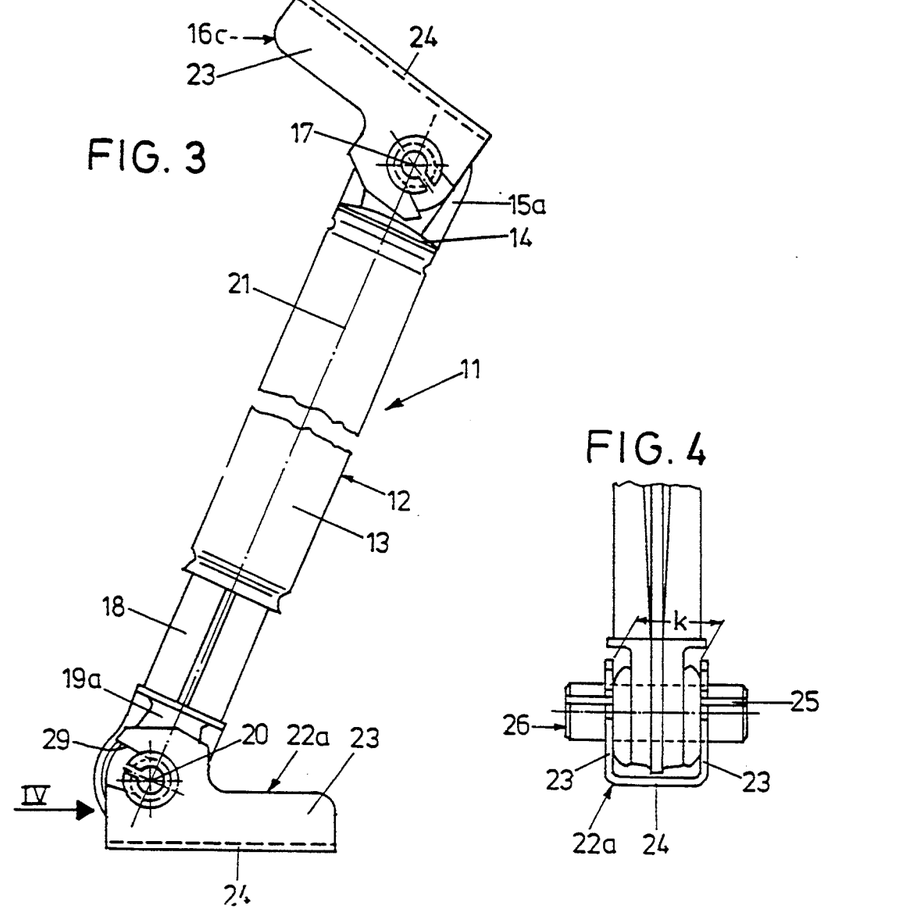
FIG. 3 shows a first embodiment of an articulation of a vibration damper in the drum washing machine.
FIG. 4 is a lateral view according to the arrow IV in FIG. 3.
Figures 5, 6:
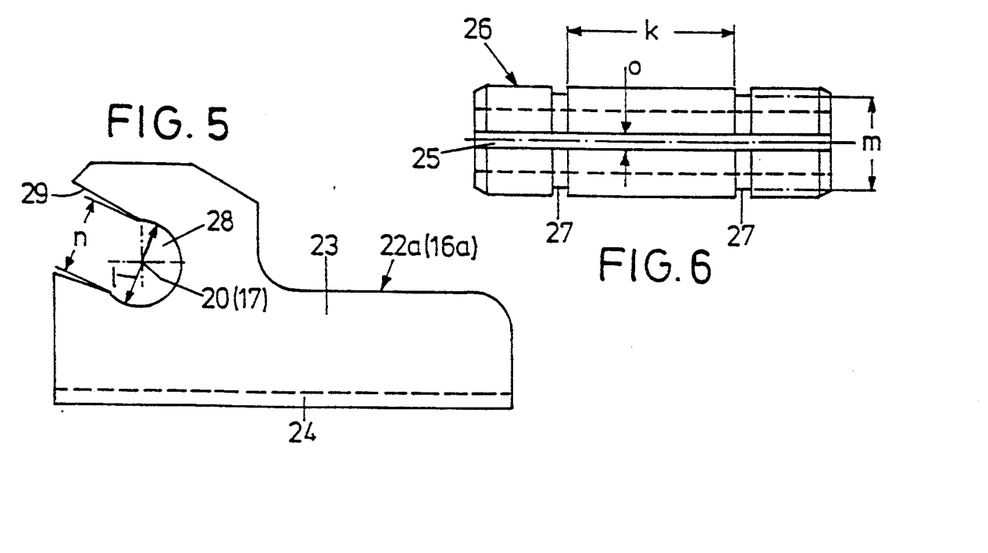
FIG. 5 is an illustration on an enlarged scale of a bearing of the articulation according to FIGS. 3 and 4.
FIG. 6 shows a bearing sleeve of the articulation according to FIGS. 3 and 4.

A drum washing machine with a horizontal drum axis 1 has an oscillatory washer unit 2 with a drive motor 3 driving the washing drum not shown in detail by way of a belt drive 4. Further components connected with the washer unit 2, such as a transmission, are not shown for reasons of simplicity. The oscillatory washer unit 2 is suspended by means of screw tension springs 7 on a washing machine housing 6 supported on a machine stand formed by a main frame 5. The tension springs 7 are on the one hand secured to loops 8 arranged in the upper area of the washer unit 2. On the other hand, they are suspended on loops 9 provided on side walls 10 of the housing 6.

Instead of the washer unit 2 being suspended on tension springs 7, a known support of the washer unit 2 may be provided by way of so-called telescopic spring struts on the machine stand 5, as known from U.S. Pat. No. 4,991,412. It is of decisive importance that the washer unit 2 is suspended or supported freely oscillatory.

Further, vibration dampers 11 are arranged between the washer unit 2 and the machine stand 5, which as a rule are frictional dampers as for instance known from U.S. Pat. No. 4,765,444 or from U.S. Pat. No. 4,934,493 or from EP 0 301 190 A1 or from U.S. Pat. No. 4,946,008, to which reference is made in this regard. Of course, the vibration dampers may also be in the form of hydraulically acting dampers.

In the examples of embodiment specified in the following the vibration damper 11 has a housing 12. The housing 12 essentially consists of a cylindrical tube 13 closed at one end by means of a bottom 14. On the outside of the bottom 14 an articulated bush 15 is provided as an articulating element, by means of which the vibration damper 11 is pivotable on a bearing 16 on the washer unit 2 about a pivot axis 17 extending parallel to the drum axis 1.

Each vibration damper 11 further has a tappet 18 having in like manner at its outer end an articulated bush 19, of which the pivot axis 20 in the same way as the pivot axis 17 is perpendicular to the central longitudinal axis 21 of each vibration damper 11. By this articulated bush 19 the vibration damper 11 is pivotably seized in a beating 22 arranged on the machine stand 5 in such a manner that the pivot axis 20 also extends parallel to the drum axis 1.

In the following examples of embodiment the details of the attachment of the articulated bushes 15, 19 to the bearings 16, 22 are described more closely, the same reference numerals being used as in the general description of FIGS. 1 and 2 with, however, a different letter being added for each embodiment.

In the example of embodiment according to FIGS. 3 to 6 the bearings 16a and 22a are approximately U-shaped. They have cheeks 23 which are each identical in form and connected with a transverse web 24 secured to the main frame 5 and the washer unit 2, respectively. Bearing sleeves 26 of elastic material, for instance hard elastic plastic, provided with a longitudinal slot 25 are arranged in the articulated bushes 15a and 19a, respectively. Each bearing sleeve 26 has two circumferential grooves 27 of which the distance k in the direction towards the pivot axes 17 and 20, respectively, corresponds to the distance k of the cheeks 23 of a bearing 16a and 22a, respectively.

Bearing openings 28 receiving the bearing sleeve 26 are formed in the cheeks 23. These bearing openings 28 are in alignment with each other in the direction of the corresponding pivot axis 17 and 20, respectively. Their diameter I essentially corresponds to the diameter m of the circumferential grooves 27.

For the introduction of a bearing sleeve 26 into a bearing 16a or 22a, respectively, the bearing openings 28 are each provided with an inlet 29, of which the direction extends at right angles to the direction of the central longitudinal axis 21 in the example of embodiment according to FIGS. 3 to 6. The inlets 29 are slightly funnel-shaped, i.e. they taper towards each bearing opening 28. The width n of the inlet 29 at the transition into each bearing opening 9.28 is smaller than the diameter 1, the difference of the diameter 1 and the width n being in turn smaller than the width o of the longitudinal slot 25.

The bearings 16a and 22a consist of a rigid, non-elastic material, such as sufficiently stable sheet metal, so that the cheeks 23 are rigid at right angles to the direction of the inlet 29.

For the assembly of a vibration damper 11 the bearing sleeve 26 located in the upper articulated bush 15a is introduced crosswise into the inlets 29 of the beating 16a located on the washer unit 2. Upon this the bearing sleeve 26 is elastically compressed, which is ensured by the longitudinal slot 25. When the bearing sleeve 26 enters into the beating openings 28, it elastically widens again. The cheeks 23 engage with the circumferential grooves 27. The assembly of the articulated bush 19a in the bearing 22a takes place in like manner. The assembly of the vibration damper 11 is made by two simple hand operations. Since the inlets 29 are arranged at right angles to the central longitudinal axis 21 of the vibration damper 11 in its position of rest, no forces or at best only minor forces acting on the bearing sleeves 26 in the direction towards the inlet 29 result upon deflection of the axis 21 out of its position of rest. Moreover only the damping forces act upon the vibration dampers 11. Finally, the bearing sleeves 26 are retained in the bearing openings 28 by the above-described elastic forces.

In the following examples of embodiment only the articulation of the vibration damper 11 in the beating located on the main frame 5 is in each case still illustrated and described. The attachment to the washer unit 2 is as a rule identical.

Figures 7, 8, 9:
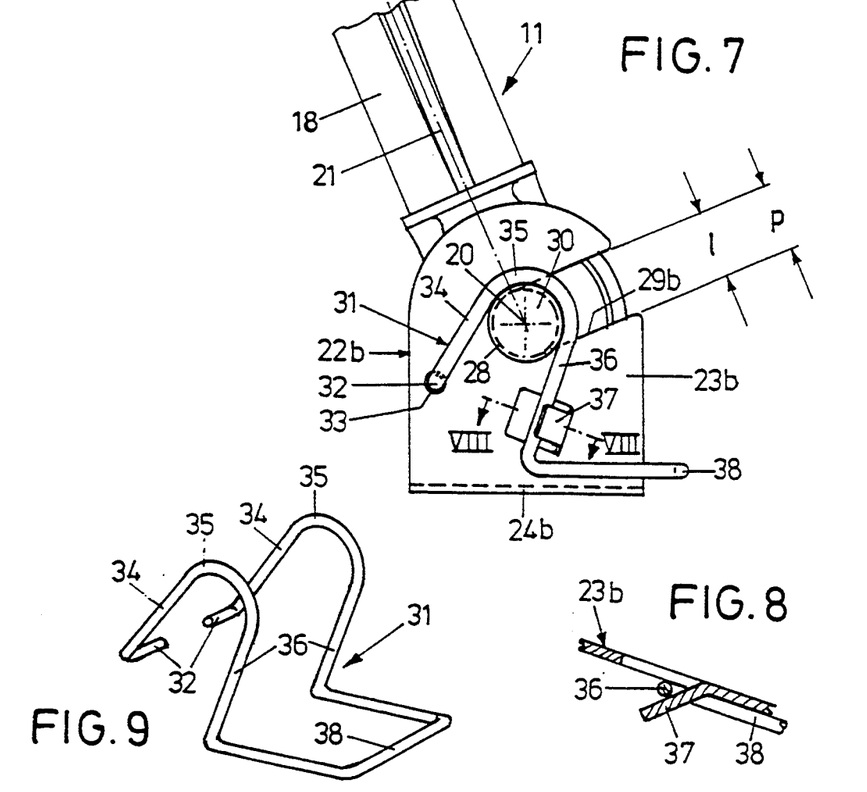
FIG. 7 is a partial lateral view of a second embodiment of an articulation.
FIG. 8 shows an abutment of the articulation of FIG. 7 according to the section line VIII—VIII in FIG. 7.
FIG. 9 shows a safety clamp of the articulation according to FIGS. 7 and 8.

In the example of embodiment according to FIGS. 7 to 9 a bearing bolt 30 is arranged in the articulated bush 19b, which is identical in form with the bearing sleeve 26 with the only difference that it has no longitudinal slot. In this regard reference can be made to the above description. Inlets 29b are formed in the bearing openings 28 in the cheeks 23b of the beating 22b, the width p of which inlets equalling the diameter 1 of the bearing opening. The bearing bolts 30 do not lock into place in the bearing openings 28, but they are only pushed or put in.

For the purpose of securing the bearing bolt 30 in the bearing 22 a safety clamp 31 is provided, which surrounds the two cheeks 23b from outside and is pivotably supported with two free ends 32 facing each other in corresponding recesses 33. Adjoining these free ends the clamp 31 has an approximately U- or V-shaped section 34 with an approximately semi-circular segment 35 about in its middle, which grips over the part of the beating bolt 30 positioned towards the inlet 29b when the safety clamp is locked. The semi-circular segment 35 is in each case followed by a leg 36 which is part of the section 34 and which can be arrested behind an abutment 37 partially punched out of the respective cheek 23b in the form of a tab or a web and bent outwards, as seen in FIG. 8. The legs 36 are connected with each other by a C-shaped connecting and operating section 38, so that the whole safety clamp 31 consisting of hard elastic wire is made in one piece.

After the bearing bolt 30 of the articulated bush 19b has been inserted in the bearing openings 28 through the inlets 29b, the safety clamp already locked elastically into the recess 33 with its free ends 32 is pivoted downwards—clockwise in FIGS. 7—the two legs 36 being widened elastically when slipping over the abutment 37. They lock into place behind the respective abutment 37, as seen in FIG. 8.

Figure 10:
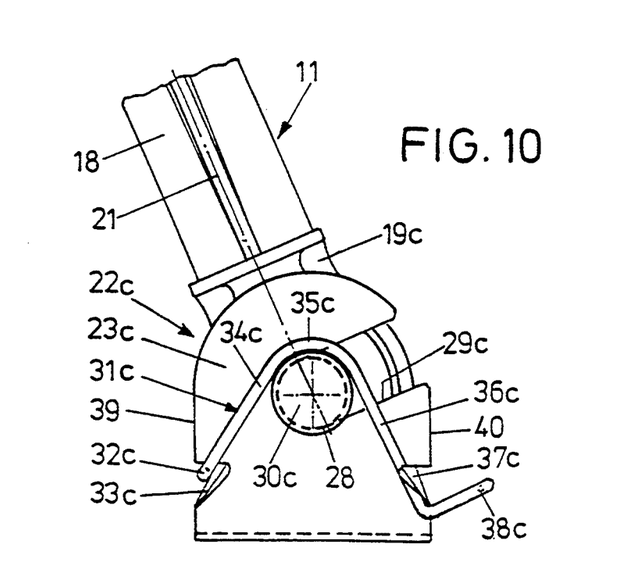
FIG. 10 is a partial lateral view of a third embodiment of an articulation.

The example of embodiment according to FIG. 10 essentially differs from that according to FIGS. 7 to 9 only in that on the one hand the recess 33c for receiving the respective free end 32c of the safety clamp 31c is provided and integrated in a lateral edge 39 of the cheek 23c, i.e. has been punched out. This recess 33c is located opposite the inlet 29c for the bearing bolt 30c entering the bearing opening 28. The abutment 37c is punched out of and bent off the lateral edge 40 of the respective cheek 23c that is opposite, i.e. adjacent to the inlet 29c. The respective leg 36c of the safety clamp 31c is locked into place behind the abutment 37c in the same way as with the embodiment according to FIGS. 7 to 9. Whereas in the embodiment according to FIGS. 7 to 9 the bearing bolt 30 is surrounded by the safety clamp 31 by about 180°, the corresponding angle of contact in the embodiment according to FIG. 10 is a bit smaller.

Figure 11:
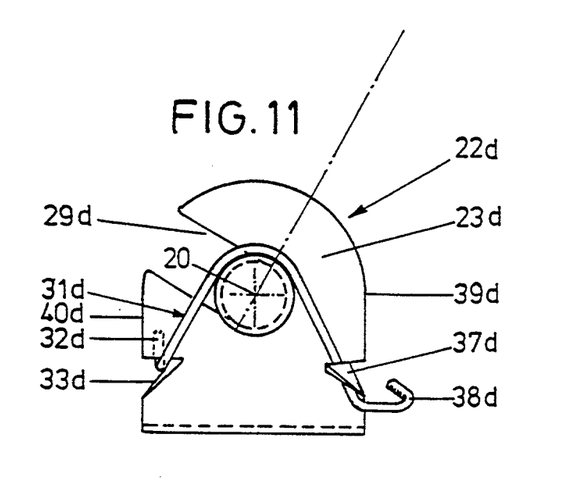
FIG. 11 is a partial lateral view of a fourth embodiment of an articulation.

The embodiment according to FIG. 11 essentially differs from that according to FIG. 10 in that the recess 33d is adjacent to the inlet 29d, whereas the abutment 37d is located in the vicinity of the lateral edge 39d. Further, the safety clamp 31d is divided, i.e. two safety clamps 31d are provided, one of each of them being associated with each cheek 23d. For the purpose of the respective safety clamp 31d being arrested also in the vicinity of the recess 33d in the direction of the pivot axis 20 relative to to the corresponding cheek 23d, the free end 32d of the safety clamp 31d is bent up such that it grips over the cheek 23d on its inside. Of course this two-piece structure of the safety clamp 31d can also be provided for the embodiment according to FIG. 10. In accordance with the two-piece structure only one operating section 38d is in each case provided at the end of the safety clamp 31d opposite the free end 32d.

Figure 12:
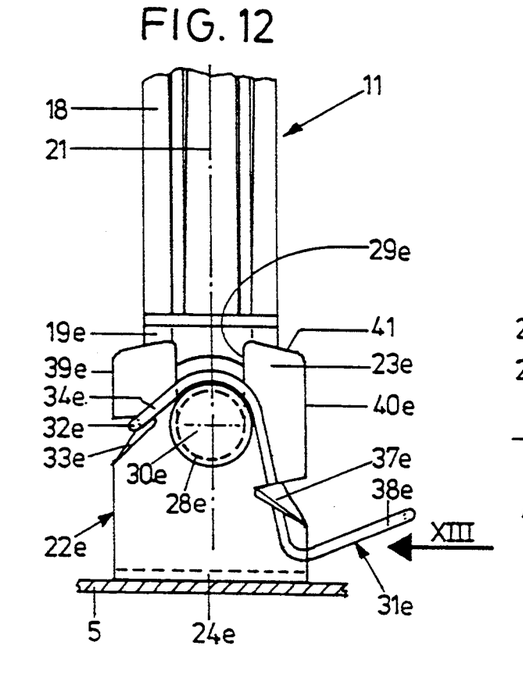
FIG. 12 is a partial lateral view of a fifth embodiment of an articulation.
Figure 13:
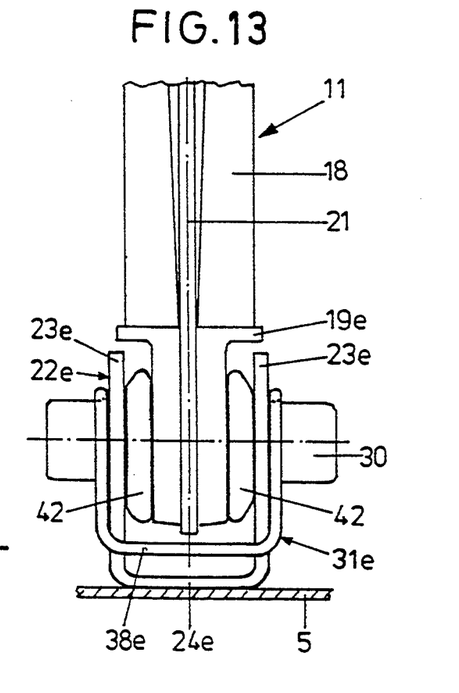
FIG. 13 is a view of the articulation of FIG. 12 according to the arrow XIII in FIG. 12.

The embodiment according to FIGS. 12 and 13 differs from all the preceding embodiments in that the inlet 29e extends in the direction of the central longitudinal axis 21 of the vibration damper 11 and is open towards the latter. Each inlet 29e is therefore open towards an upper edge 41 located between the lateral edges 39e and 40e and extending at right angles relative to them. In this case, too, the safety clamp 31e is supported with its free ends 32e in recesses 33e punched out of the cheek 23e in the vicinity of a lateral edge 39e in like manner as with the embodiment according to FIG. 10.

Correspondingly, the abutment 37e is bent up from the cheek 23e in the vicinity of the opposite lateral edge 40e. It can further be seen from FIG. 13 that the articulated bush 19e has damping inserts 42 between itself and the cheeks 23e of the bearing 22e. These inserts are basically provided in all embodiments.

Figure 14:
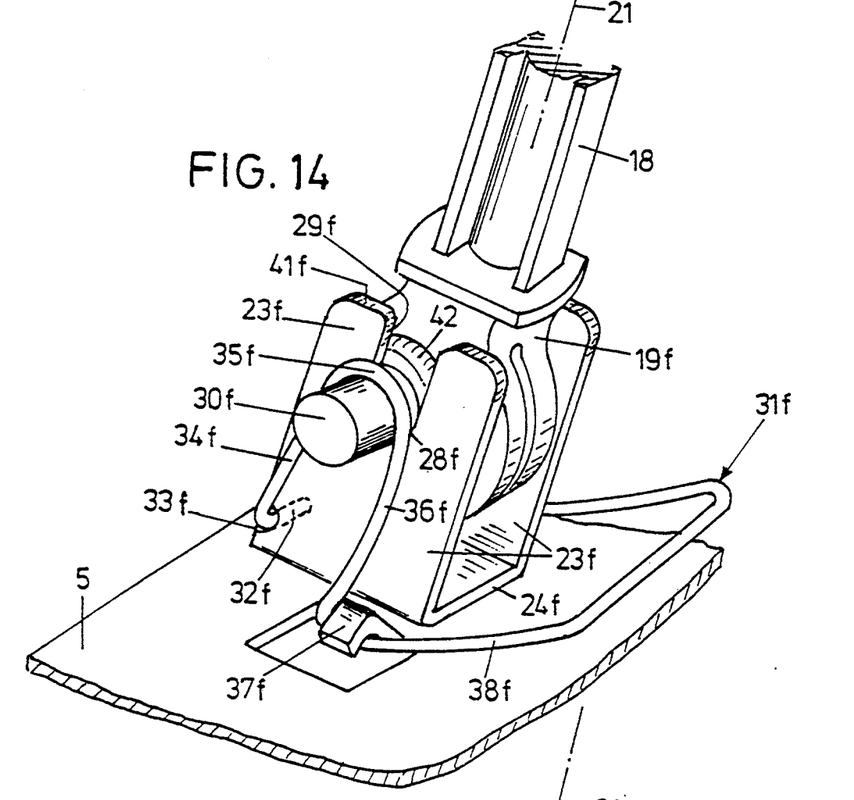
FIG. 14 is a perspective partial lateral view of a sixth embodiment of an articulation.

Differing from the embodiment according to FIGS. 12 and 13 in the embodiment according to FIG. 14 the abutment 37f is not punched out of the corresponding cheek 23f and bent up from it, but it is punched out of the main frame 5 of the washing machine and bent up as a hook. The safety clamp 31f surrounds the bearing bolt 30f by about 180° as with the embodiments according to FIGS. 7 to 9 and FIG. 11. In this case the leg 36f of the safety clamp 31f does not engage with the abutment 37f, but rather the connecting and operating section 38f offset by some angle relative to the leg 36f.

Figure 15:
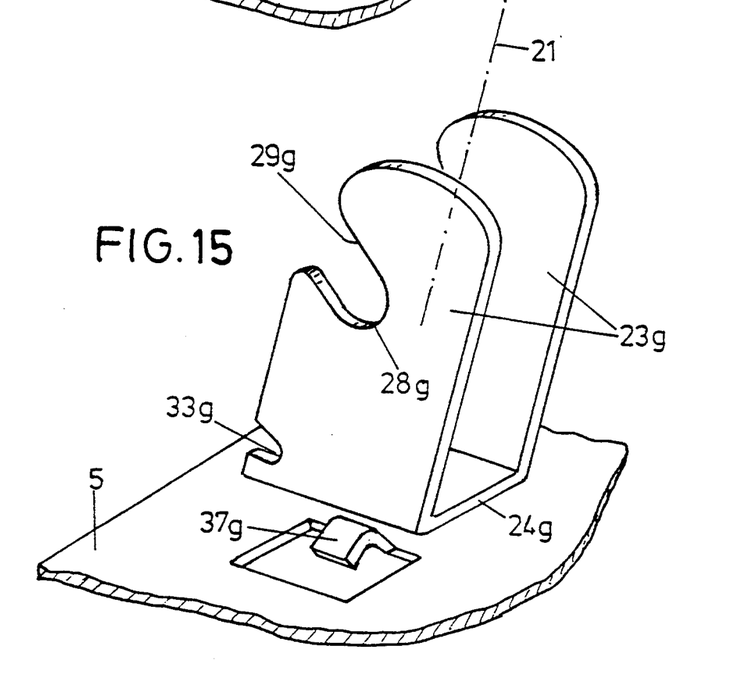
FIG. 15 is a partial lateral view of a seventh embodiment of an articulation.

The embodiment according to FIG. 15 is a modification of the embodiment according to FIG. 14 with only the inlet 29g being formed to extend approximately at tight angles to the central longitudinal axis 21.

A loosening of the articulation is not possible neither in the embodiment according to FIGS. 3 to 6 nor in the embodiments according to FIGS. 7 to 15. As a result of its elasticity the beating sleeve 26 of the embodiment according to FIGS. 3 to 6 always re-adjusts its central position in the bearing openings 28. When locked into place the safety clamps 31, 31c, 31d, 31e, 31f, 31g are subject to extreme elastic deformation so that they, too, elastically pull the bearing bolt 30, 30c and so on into the bearing openings 28 there re-adjusting its central position. For this reason it is advantageous if the safety clamps 31, 31c, 31d, 31e, 31f, 31g consist of highly spring-loaded steel or even of spring steel.

What is claimed is:

1. A washing machine comprising:
   a washing machine housing (6);
   a washer unit (2) with a horizontal drum axis (1) arranged in the washing machine housing (6);
   at least one vibration damper (11) having a first articulated bush (15) being supported in a bearing (16) on the washer unit (2) to pivot about a pivot axis (17) and having a second articulated bush (19) being supported in a bearing (22) on the washing machine housing (6) to pivot about a pivot axis (20), each pivot axis (17, 20) being parallel with the drum axis (1) and each bearing (16, 22) having two cheeks (23) which accommodate between them one of said articulated bushes (15, 19) and in which bearing openings (28) are provided, in each of which a bearing body (26, 30) connected with the articulated bush (15, 19) is supported, and the vibration damper (11) having a central longitudinal axis (21) intersecting the pivot axes (17, 20),
   wherein each bearing opening (28) of at least one bearing (16, 22) is provided with an inlet (29) for the bearing body (26, 30) open towards an edge (40, 41) of the respective cheek (23) and wherein the bearing body is retained in the bearing openings (28) by means of an elastic locking in the direction of the inlets (29),
   wherein the bearing body is in the form of a bearing bolt (30) and in that the bearing bolt is arrested by elastic locking by means of at least one safety clamp (31).

2. A washing machine according to claim 1, wherein the inlets (29, 29b, 29c, 29d, 29g) are biased relative to the central longitudinal axis (21) of the at least one vibration damper (11).

3. A washing machine according to claim 1, wherein the at least one safety clamp (31) is pivotably supported with at least one free end (32) in a recess (33) of a cheek (23) of the beating (22).

4. A washing machine according to claim 1, wherein the safety clamp is elastically lockable on an abutment (37) in a position, in which it partially surrounds the bearing bolt (30) in the vicinity of the inlet (29) and retains it in the bearing opening (28).

5. A washing machine according to claim 4, wherein the abutment (37, 37c, 37d, 37e) is formed on the cheek (23b, 23c, 23d, 23e).

6. A washing machine according to claim 5, wherein the abutment (37) is punched out of and bent up from the cheek (23).

7. A washing machine comprising:
   a washing machine housing (6);
   a washer unit (2) with a horizontal drum axis (1) arranged in the washing machine housing (6);
   at least one vibration damper (11) having a first articulated bush (15) being supported in a bearing (16) on the washer unit (2) to pivot about a pivot axis (17) and having a second articulated bush (19) being supported in a bearing (22) on the washing machine housing (6) to pivot about a pivot axis (20), each pivot axis (17, 20) being parallel with the drum axis (1) and each bearing (16, 22) having two cheeks (23) which accommodate between them one of said articulated bushes (15, 19) and in which bearing openings (28) are provided, in each of which a bearing body (26, 30) connected with the articulated bush (15, 19) is supported, and the vibration damper (11) having a central longitudinal axis (21) intersecting the pivot axes (17, 20), wherein each bearing opening (28) of at least one bearing (16, 22) is provided with an inlet (29) for the bearing body (26, 30) open towards an edge (40, 41) of the respective cheek (23) and wherein the bearing body is retained in the bearing openings (28) by means of an elastic locking in the direction of the inlets (29), wherein the bearing body is in the form of a bearing bolt (30) and in that the bearing bolt is arrested by elastic locking by means of at least one safety clamp (31), and wherein the inlets (29, 29b, 29c, 29d, 29g) are biased relative to the central longitudinal axis (21) of the at least one vibration damper (11).

8. A washing machine according to claim 7, wherein the at least one safety clamp (31) is pivotably supported with at least one free end (32) in a recess (33) of a cheek (23) of the bearing (22).

9. A washing machine according to claim 7, wherein the safety clamp is elastically lockable on an abutment (37) in a position, in which it partially surrounds the bearing bolt (30) in the vicinity of the inlet (29) and retains it in the bearing opening (28).

10. A washing machine according to claim 9, wherein the abutment (37, 37c, 37d, 37e) is formed on the cheek (23b, 23c, 23d, 23e).

11. A washing machine according to claim 10, wherein the abutment (37) is punched out of and bent up from the cheek (23).

12. A washing machine according to claim 9, wherein the abutment (37f, 37g) is formed on the washing machine.

13. A washing machine according to claim 12, wherein the abutment (37) is punched out of and bent up from the washing machine housing.

14. A washing machine comprising:
a washing machine housing (6);
a washer unit (2) with a horizontal drum axis (1) arranged in the washing machine housing (6);
at least one vibration damper (11) having a first articulated bush (15) being supported in a bearing (16) on the washer unit (2) to pivot about a pivot axis (17) and having a second articulated bush (19) being supported in a bearing (22) on the washing machine housing (6) to pivot about a pivot axis (20), each pivot axis (17, 20) being parallel with the drum axis (1) and each bearing (16, 22) having two cheeks (23) which accommodate between them one of said articulated bushes (15, 19) and in which bearing openings (28) are provided, in each of which a bearing body (26, 30) connected with the articulated bush (15, 19) is supported, and the vibration damper (11) having a central longitudinal axis (21) intersecting the pivot axes (17, 20), wherein each bearing opening (28) of at least one bearing (16, 22) is provided with an inlet (29) for the bearing body (26, 30) open towards an edge (40, 41) of the respective cheek (23) and wherein the bearing body is retained in the bearing openings (28) by means of an elastic locking in the direction of the inlets (29), wherein the bearing body is in the form of a bearing bolt (30) and in that the bearing bolt is arrested by elastic locking by means of at least one safety clamp (31), and wherein the safety clamp is elastically lockable on an abutment (37) in a position, in which it partially surrounds the bearing bolt (30) in the vicinity of the inlet (29) and retains it in the bearing opening (28).

15. A washing machine according to claim 14, wherein the inlets (29, 29b, 29c, 29d, 29g) are biased relative to the central longitudinal axis (21) of the at least one vibration damper (11).

16. A washing machine according to claim 14, wherein the at least one safety clamp (31) is pivotably supported with at least one free end (32) in a recess (33) of a cheek (23) of the bearing (22).

17. A washing machine according to claim 16, wherein the abutment (37) is punched out of and bent up from the cheek (23).

18. A washing machine according to claim 14, wherein the abutment (37m 37c, 37d, 37e) is formed on the cheek (23b, 23c, 23d, 23e).

19. A washing machine according to claim 14, wherein the abutment (37f, 37g) is formed on the washing machine housing.

20. A washing machine according to claim 19, wherein the abutment (37) is punched out of and bent up from the washing machine housing.

21. A washing machine comprising:
a washing machine housing (6);
a washer unit (2) with a horizontal drum axis (1) arranged in the washing machine housing (6);
at least one vibration damper (11) having a first articulated bush (15) being supported in a bearing (16) on the washer unit (2) to pivot about a pivot axis (17) and having a second articulated bush (19) being supported in a bearing (22) on the washing machine housing (6) to pivot about a pivot axis (20), each pivot axis (17, 20) being parallel with the drum axis (1) and each bearing (16, 22) having two cheeks (23) which accommodate between them one of said articulated bushes (15, 19) and in which bearing openings (28) are provided, in each of which a bearing body (26, 30) connected with the articulated bush (15, 19) is supported, and the vibration damper (11) having a central longitudinal axis (21) intersecting the pivot axes (17, 20), wherein each bearing opening (28) of at least one bearing (16, 22) is provided with an inlet (29) for the bearing body (26, 30) open towards an edge (40, 41) of the respective cheek (23) and wherein the bearing body is retained in the bearing openings (28) by means of an elastic locking in the direction of the inlets (29), wherein the bearing body is in the form of a bearing bolt (30) and in that the bearing bolt is arrested by elastic locking by means of at least one safety clamp (31), and said at least one safety clamp consisting of a hard elastic wire having two free ends facing each other, each of said two free ends adjoining an approximately U-shaped section (34) having a semi-circular segment (35) at a middle of said section and a leg (36) extending from said semi-circular segment (35), each said leg (35) being connected with each other by a C-shaped connecting part to form said safety clamp in one piece, wherein, said each of said two free ends are respectively pivotedly engaged on said two cheeks, and said semi-circular segment (35) is engaged over part of said bearing bolt (30), when either said each said leg (35) or said C-shaped connecting part is engaged to said washing machine.

22. A washing machine according to claim 21, wherein the inlets (29, 29b, 29c, 29d, 29g) are biased relative to the central longitudinal axis (21) of the at least one vibration damper (11).

23. A washing machine according claim 21, wherein the at least one safety clamp (31) is pivotably supported with at least one free end (32) in a recess (33) of a cheek (23) of the bearing (22).

24. A washing machine according to claim 21, wherein the safety clamp is elastically lockable on an abutment (37) in a position, in which it partially surrounds the bearing bolt (30) in the vicinity of the inlet (29) and retains it in the bearing opening (28).

25. A washing machine according to claim 24, wherein the abutment (37, 37c, 37d, 37e) is formed on the cheek (23b, 23c, 23d, 23e).

26. A washing machine according to claim 25, wherein the abutment (37) is punched out of and bent up from the cheek (23).

27. A washing machine according to claim 24, wherein the abutment (37f, 37g) is formed on the washing machine housing.

28. A washing machine according to claim 27, wherein the abutment (37) is punched out of and bent up from the washing machine housing.

* * * * *